July 25, 1967     J. A. DIETER ET AL     3,332,208

METHOD AND MACHINE FOR LIDDING CARTONS

Filed Feb. 15, 1965     14 Sheets-Sheet 1

INVENTORS
Robert J. Weichhand
BY Julian A. Dieter
Wood, Herron and Evans
ATTORNEYS

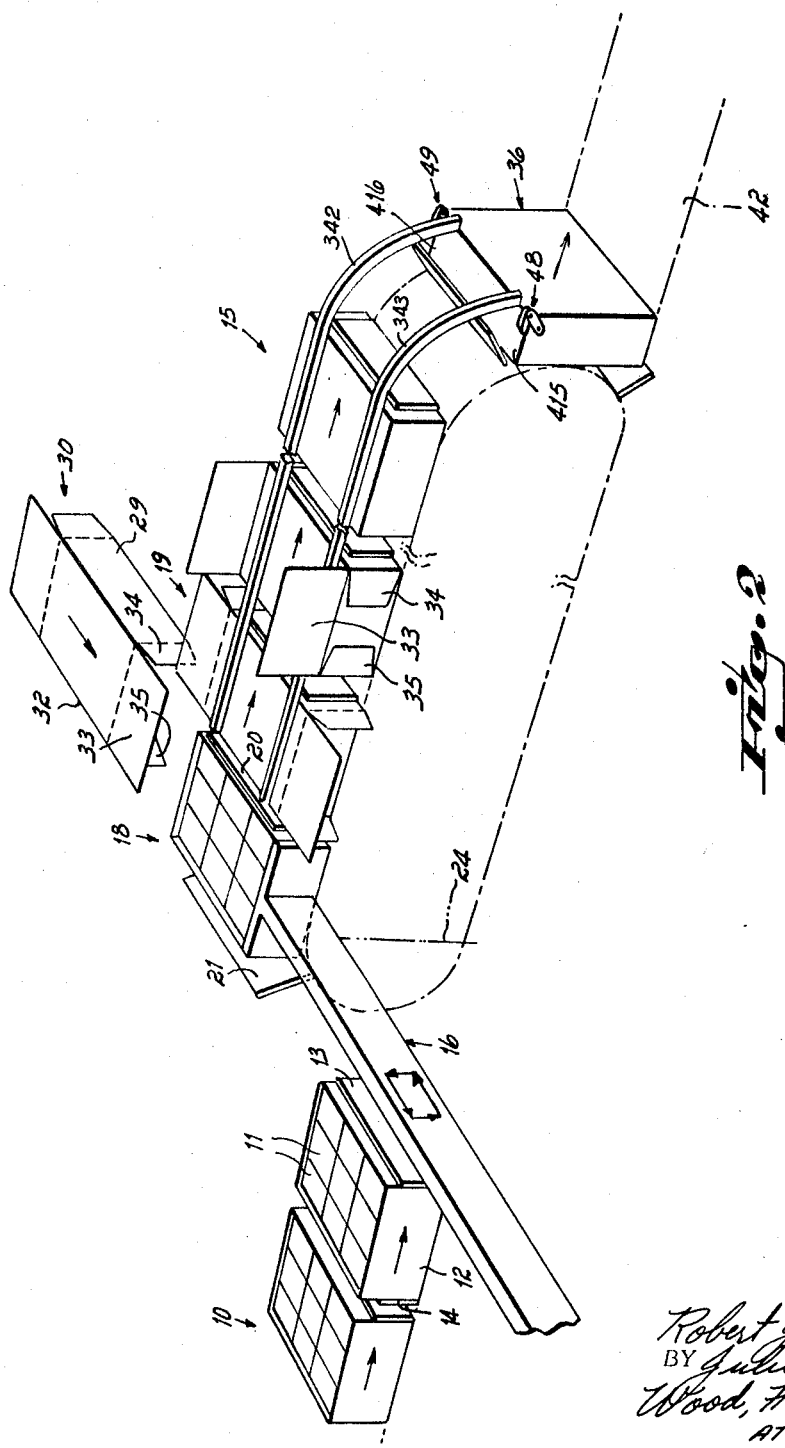

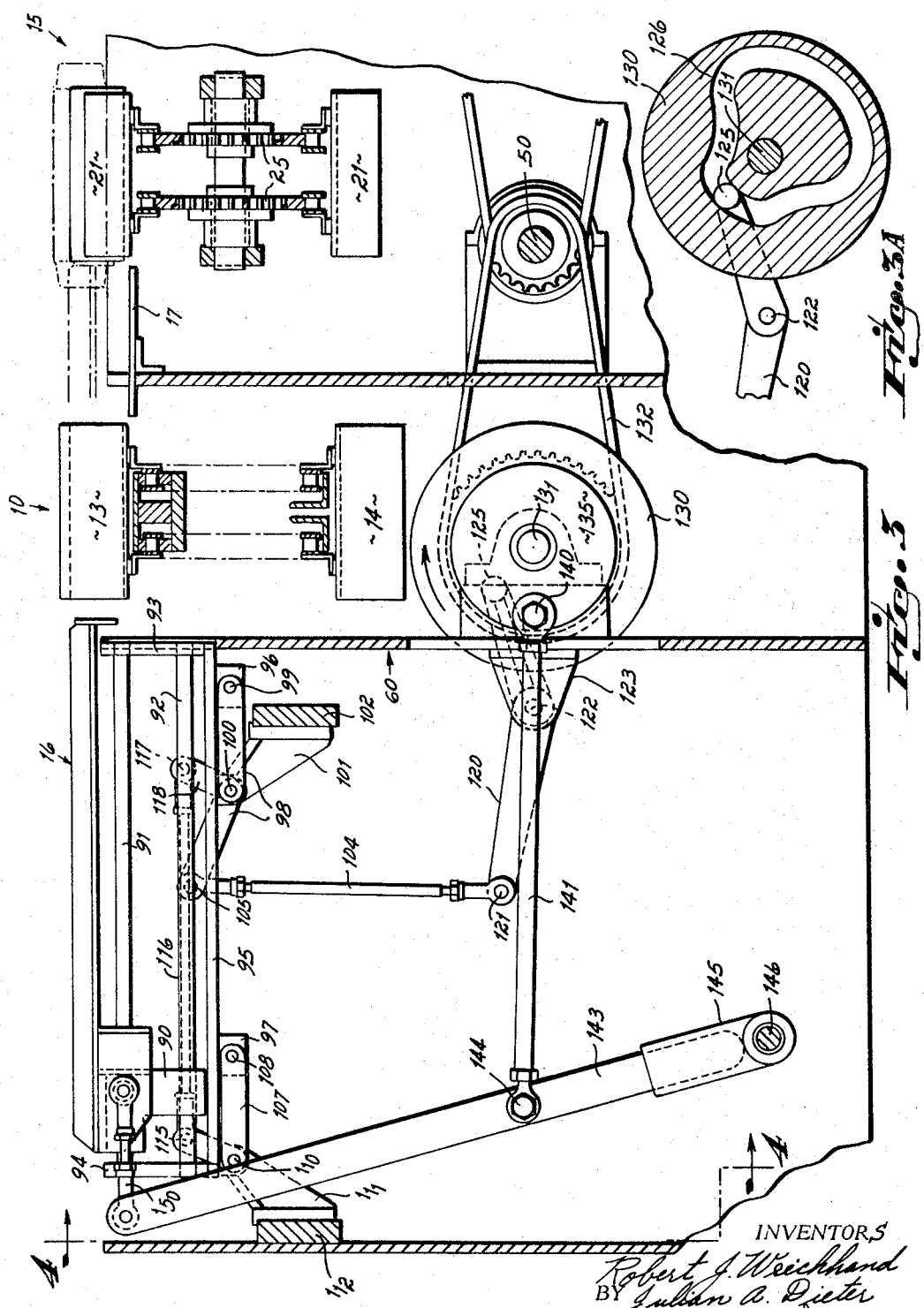

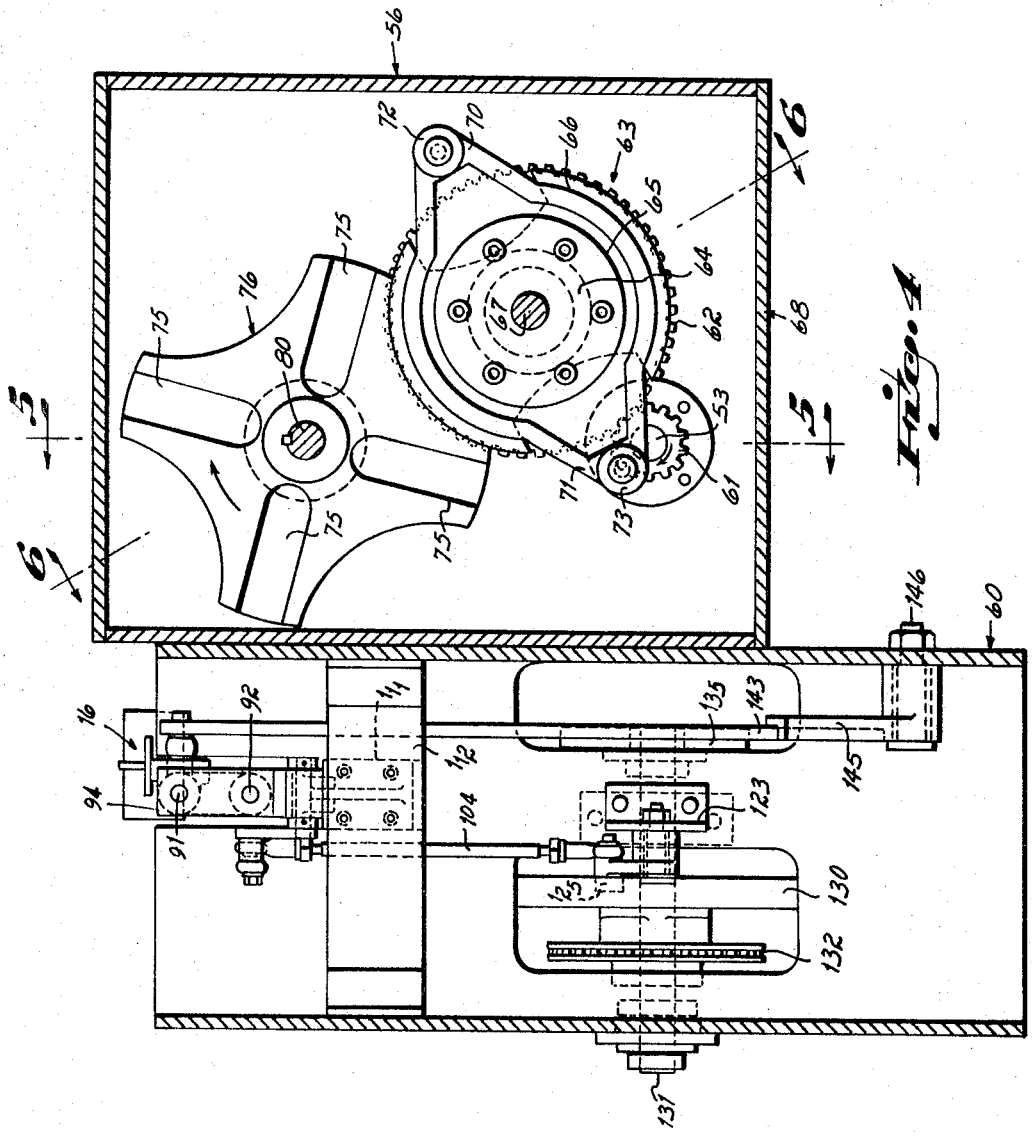

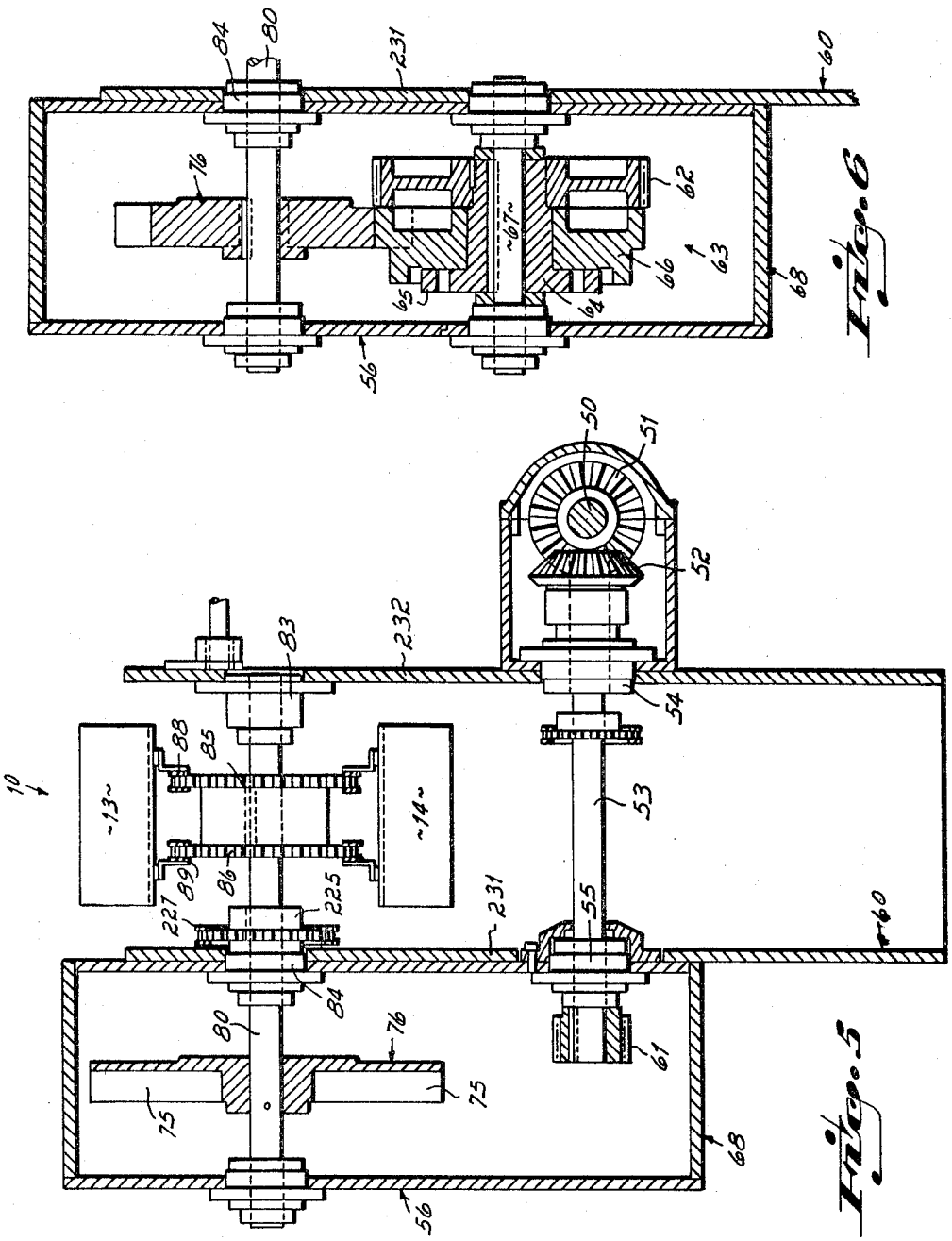

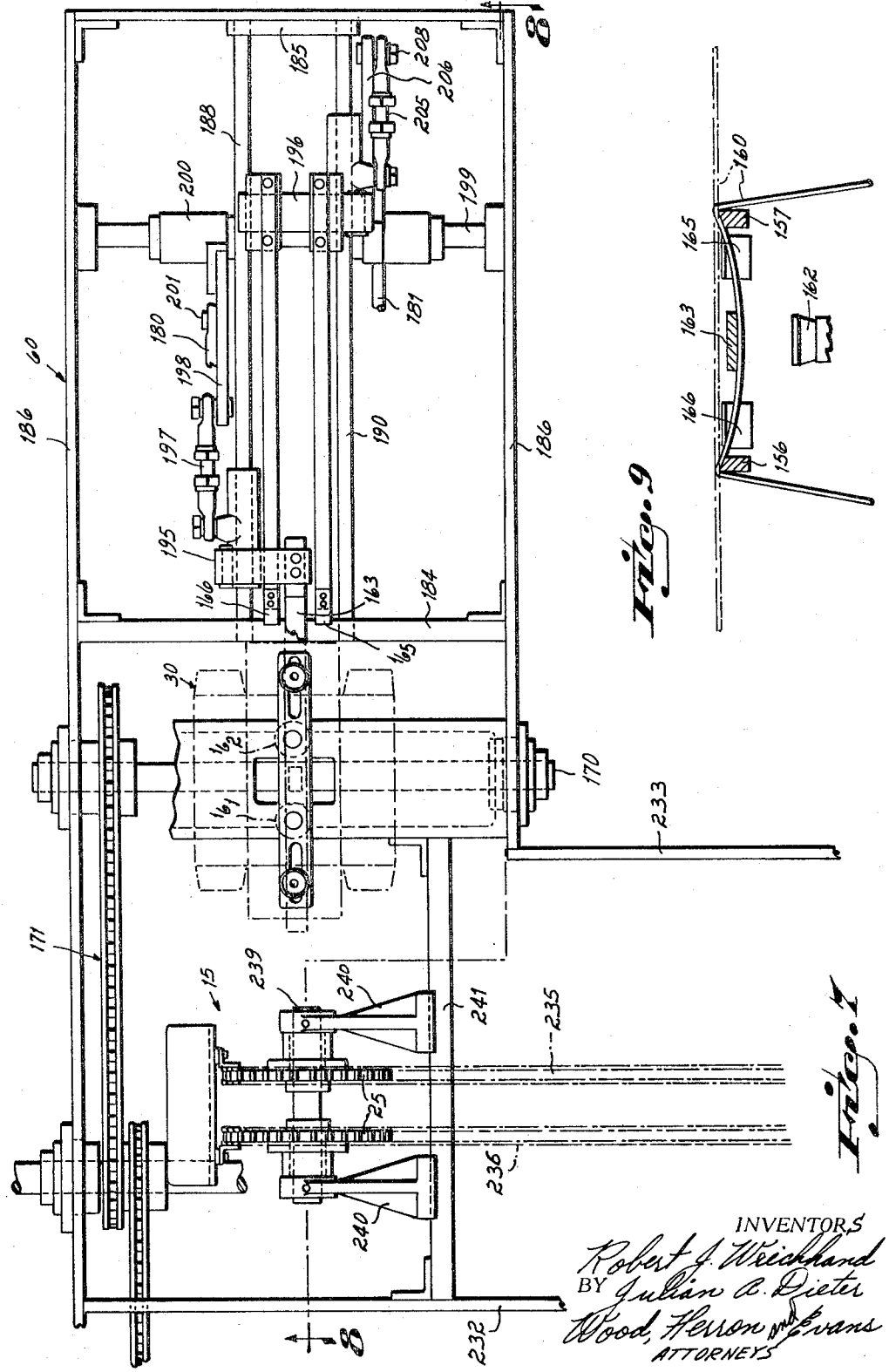

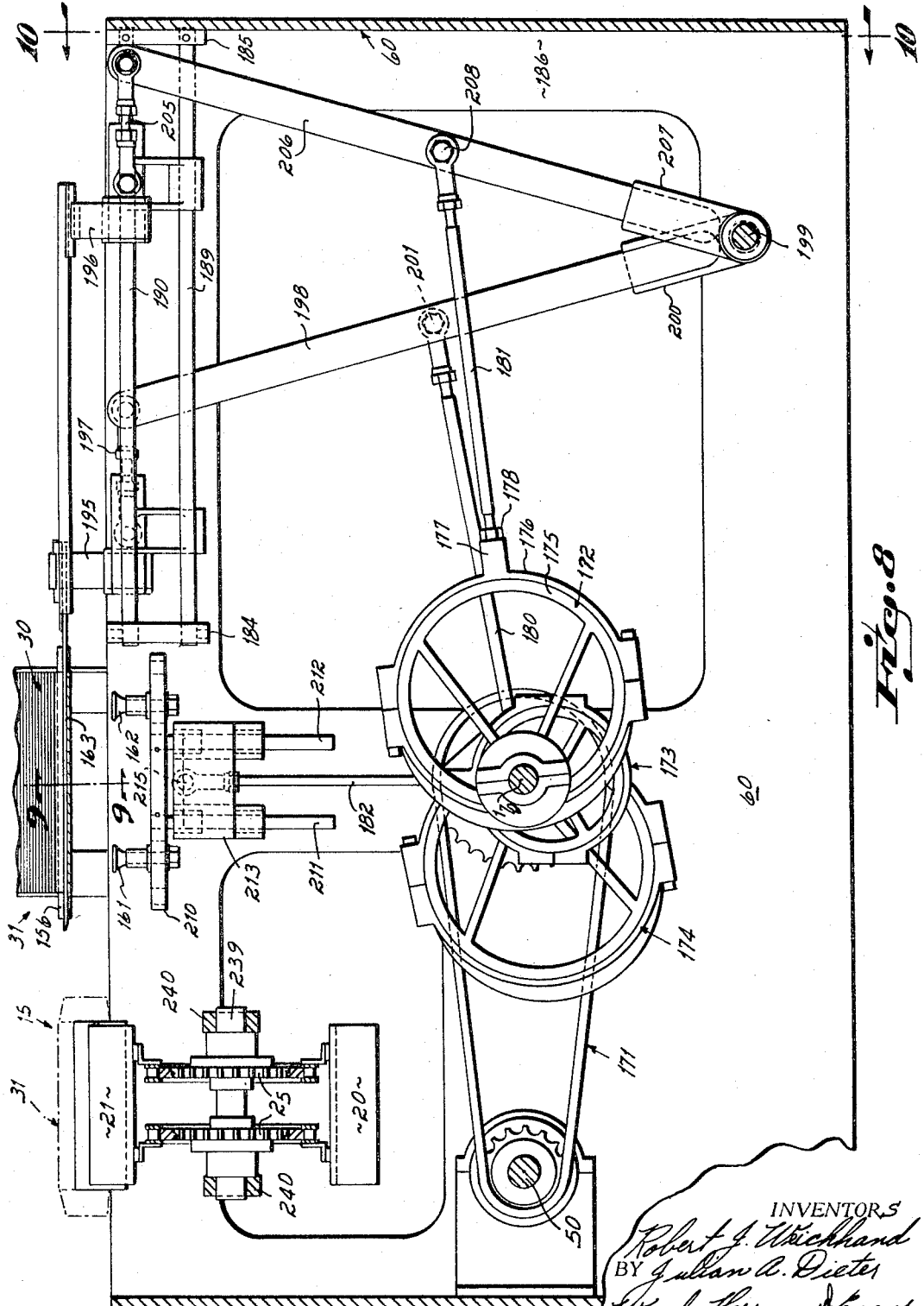

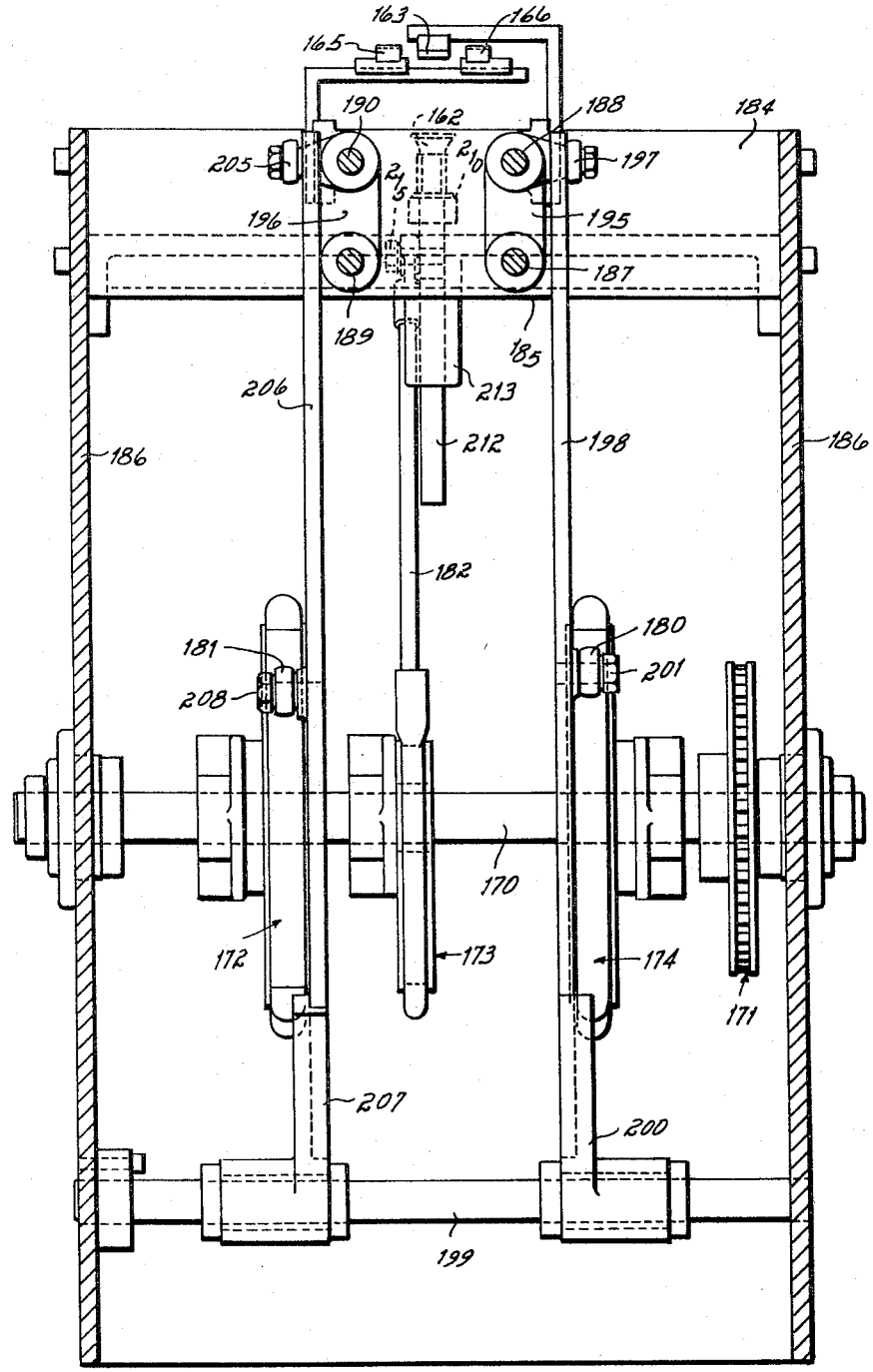

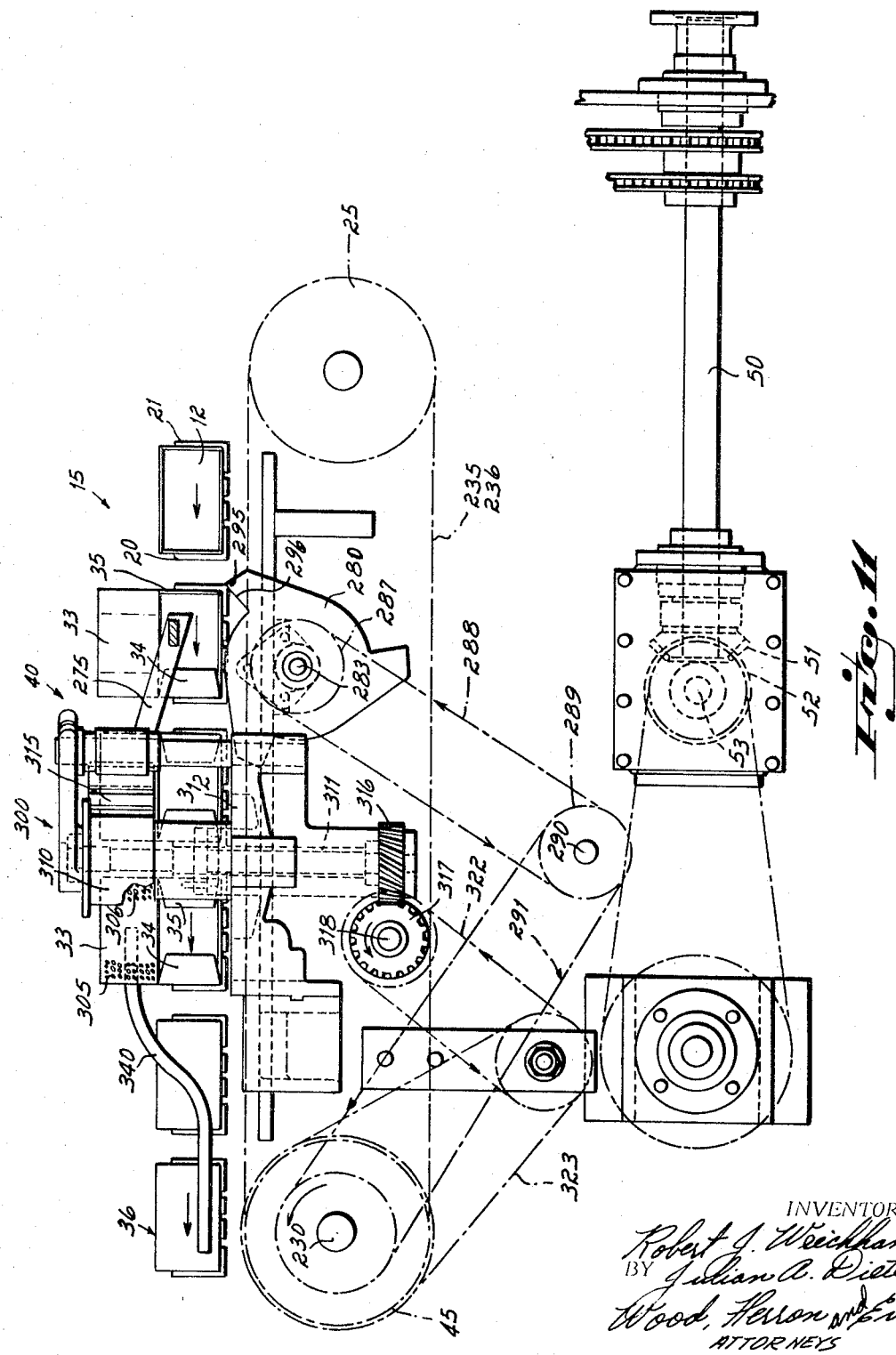

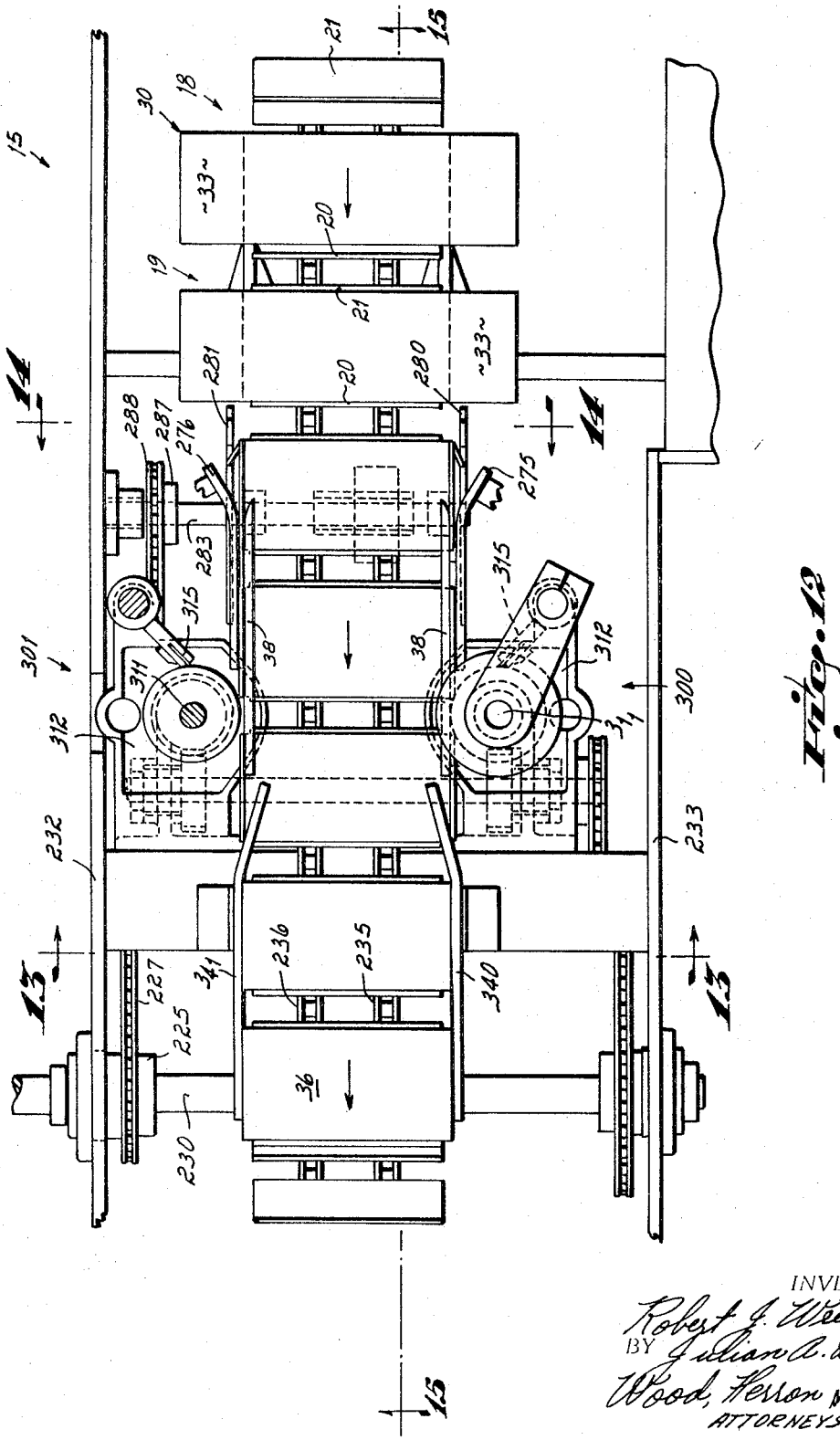

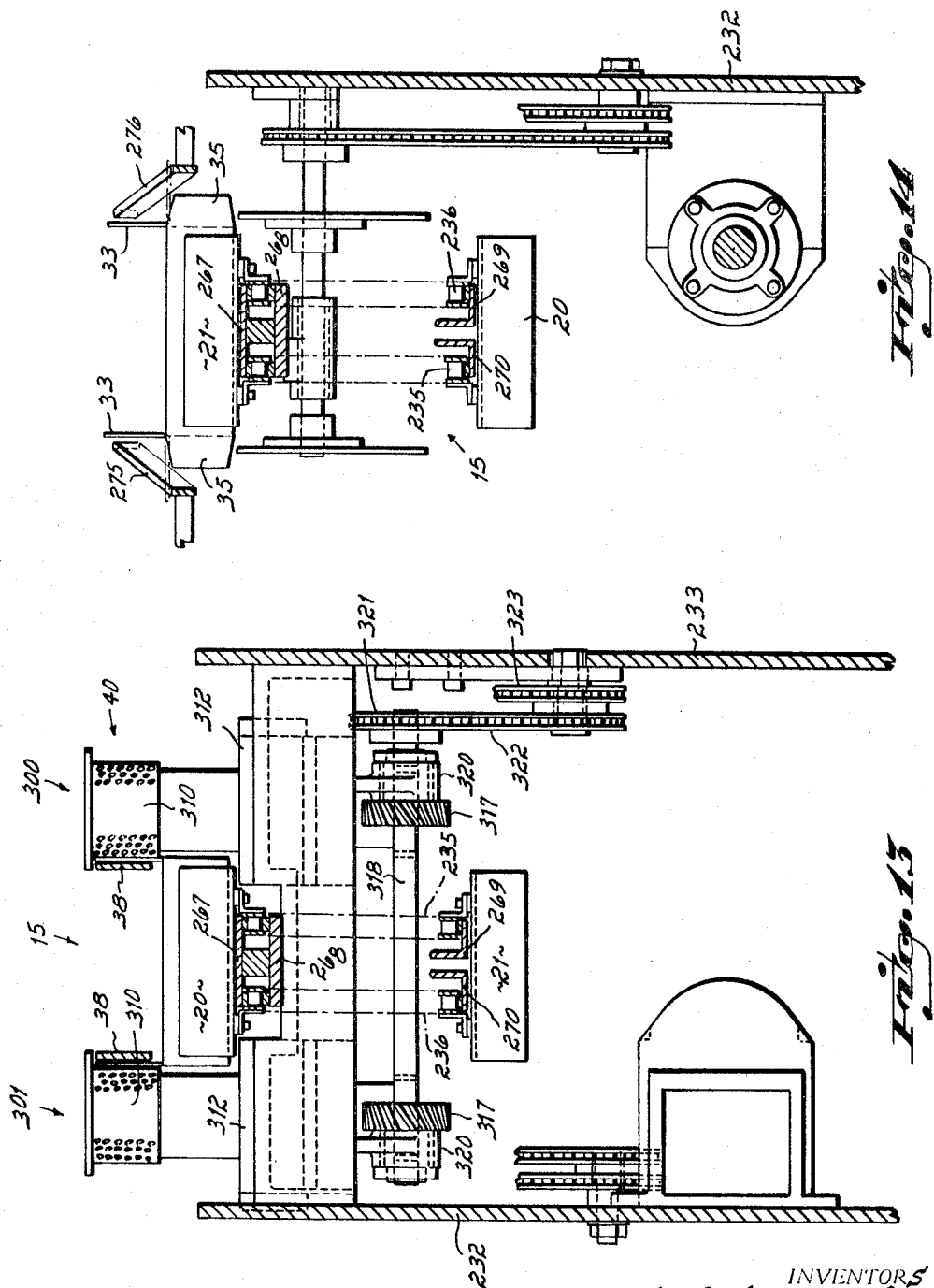

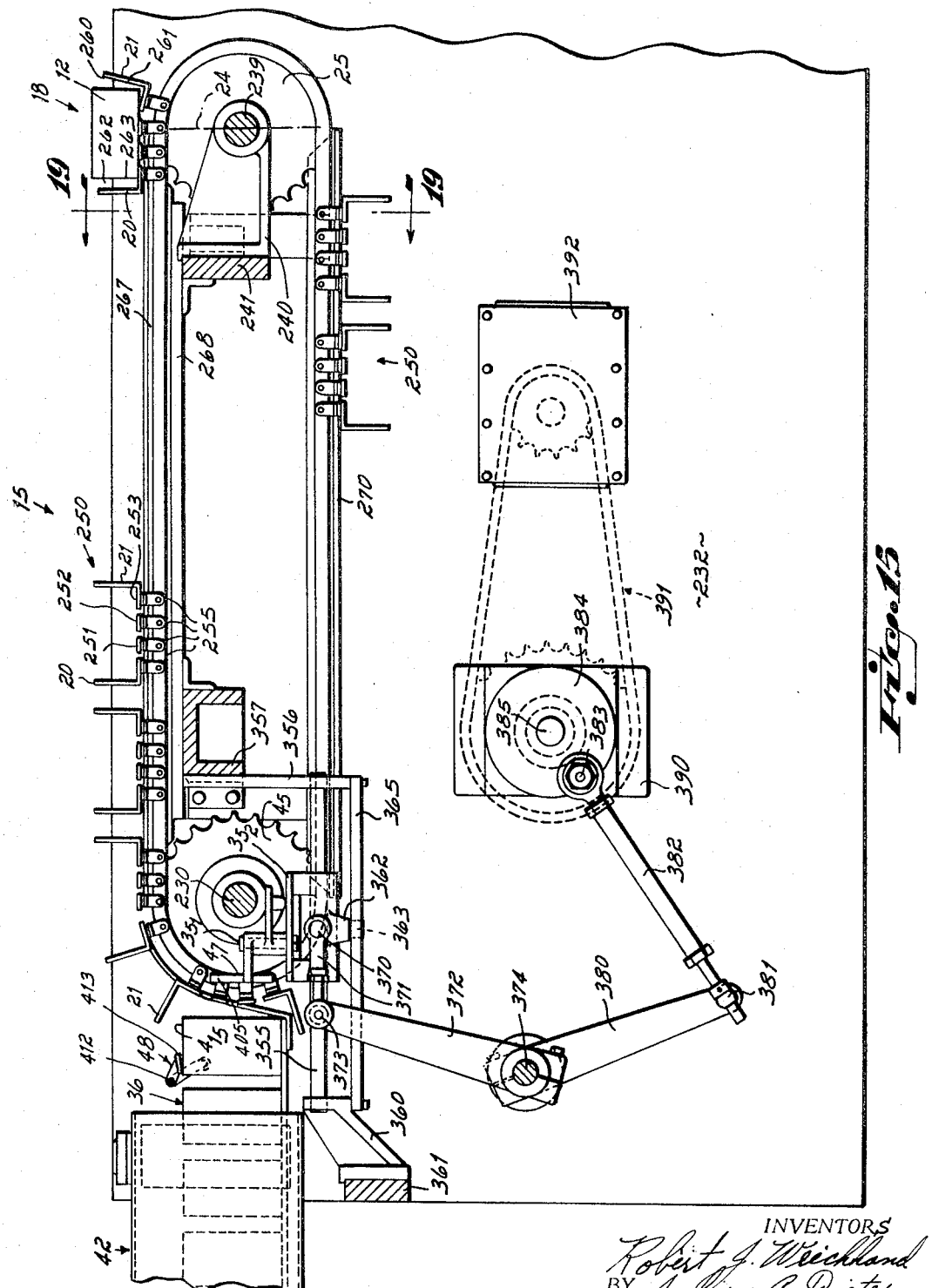

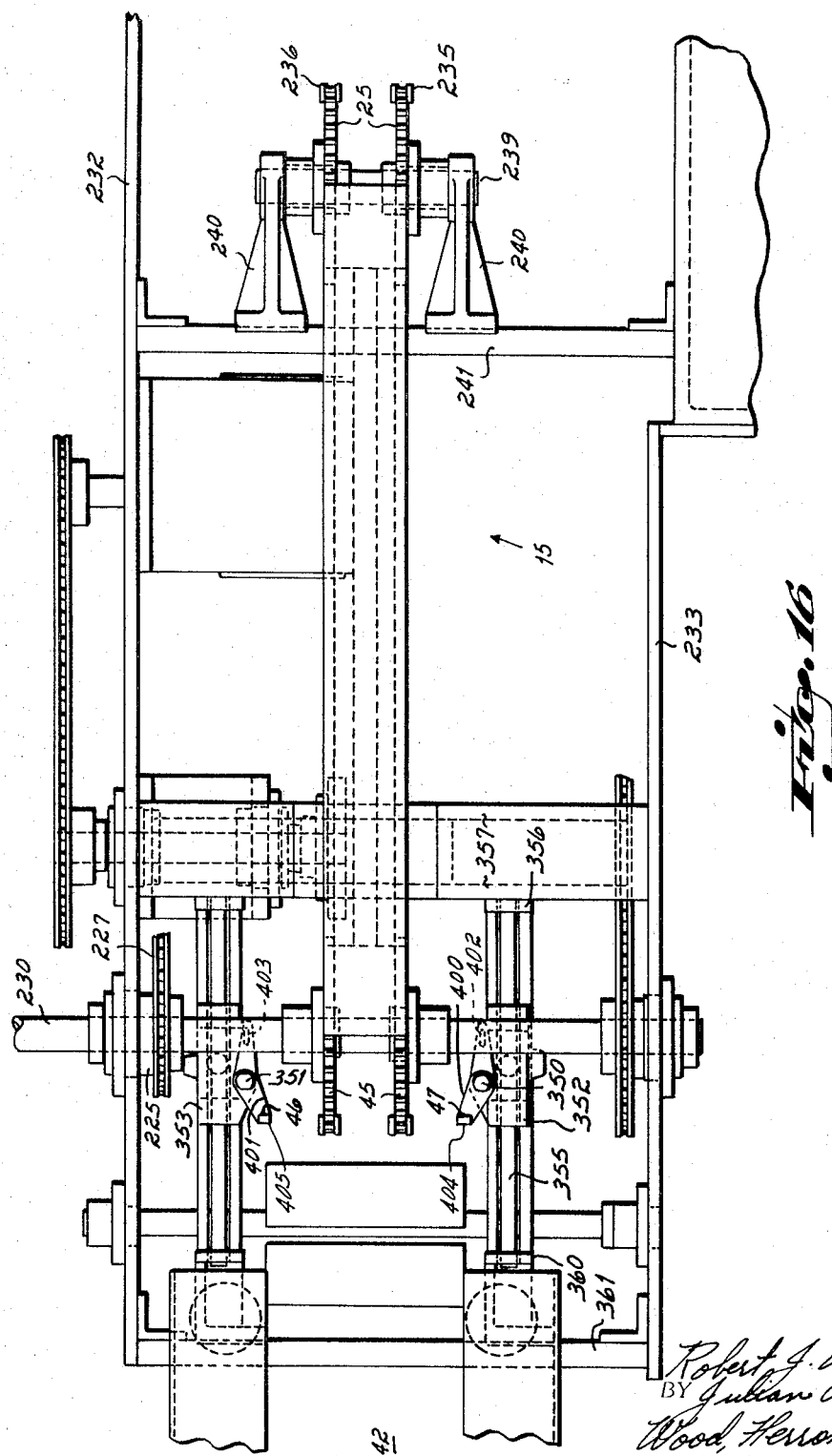

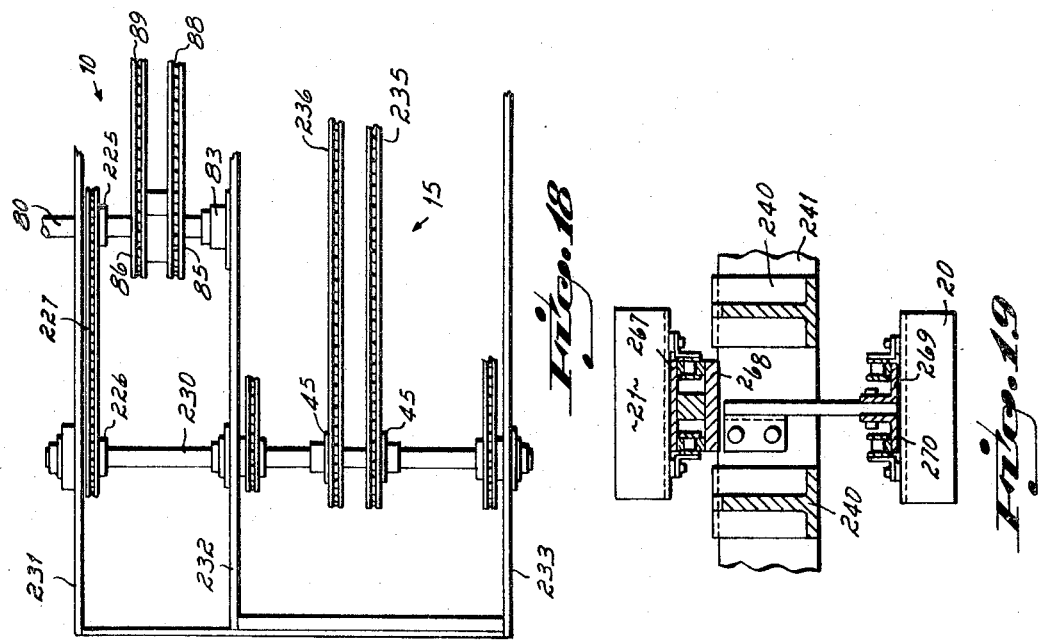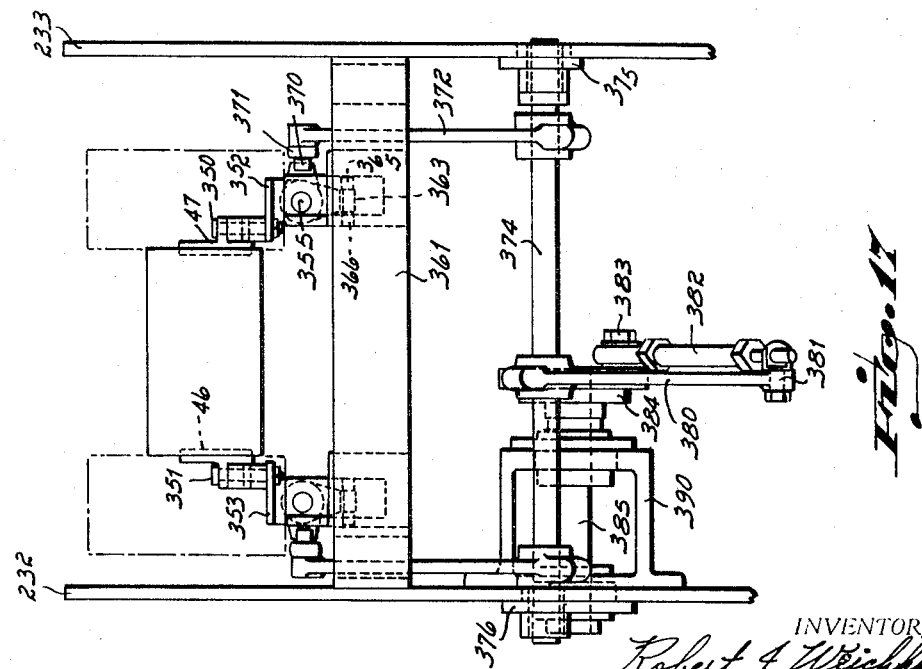

3,332,208
**METHOD AND MACHINE FOR
LIDDING CARTONS**
Julian A. Dieter, Cincinnati, Ohio, and Robert J. Weichhand, Covington, Ky., assignors to R. A. Jones & Company, Inc., Covington, Ky., a corporation of Kentucky
Filed Feb. 15, 1965, Ser. No. 432,577
12 Claims. (Cl. 53—290)

This invention relates to cartoning machines, and more particularly to a method and machine for fitting lids over filled trays.

It has been an objective of this invention to provide a method and machine for lidding cardboard trays or cartons which is less expensive and less complex than earlier conventional machines used for this purpose.

Another objective of this invention has been to provide a carton lidding machine which is practical for use on jobs and in plants where lids have heretofore been manually placed over trays. To this end, the machine of this invention has been made very compact so as to easily fit within potential customer's plants.

The method and machine of this application incorporates a new approach to the problem of putting a lid upon a filled cardboard tray or box. Specifically, according to this invention, the lid is formed over the filled tray using the tray itself as a mandrel during the forming operation.

One advantage of forming the lid over the filled tray rather than first forming it and then placing it over the tray, is the great savings in conveyor length and space which it achieves. Because the lid is simultaneously formed and placed over the tray, a separate lid forming machine or operation is not required with the result that the machine conveyor may be considerably shorter than has heretofore been possible.

Additionally, the method and machine of this invention have the inherent advantage of producing a better fitting lid over the tray and thus, a better squared and more pleasing appearing carton. Since the lid is actually formed directly upon the tray which serves as a mandrel, tolerances or gaps between the tray and lid are minimized. In fact, the two may be made to fit so tightly that no commercial machine could assemble them if performed to these dimensions. This is particularly true of weak or thin ply cardboard cartons, which do not hold their shape well and which are difficult to handle mechanically.

The machine of this application may be envisioned as incorporating an infeed conveyor, a transport conveyor, and a drying conveyor, as well as a magazine for supplying lids to the transport conveyor, and a transfer mechanism for pushing filled trays from the infeed conveyor laterally onto the transport conveyor from one side. As the trays are pushed laterally off of the infeed conveyor onto the transport conveyor, a lid having its front and rear flaps bent down and its end flaps opened, is pushed laterally over the filled carton or tray from the opposite side of the transport conveyor. Thus, the filled tray or carton no sooner arrives on the transport conveyor than a filled lid is placed over it. A rear wall of a transport conveyor bucket then engages the rear flap of the lid causing the carton (which now includes both a tray and a lid) to be pinched between the rear lug and a vertical forward lug of the transport conveyor. At this time, the end flaps of the lid are opened. The carton is then indexed through two stations during which the lid top flap is folded upwardly and the front and rear wall tabs are folded inwardly. As the carton moves between the third and fourth stations of the transport conveyor, glue is applied to the lid top flap. The top flap is then folded downwardly over the lid front and rear wall tabs, and the carton is indexed three more stations while the glue dries. The carton is then rotated 90° onto its front wall as it drops off of the transport conveyor onto a drying conveyor.

At this point, pusher bars engage the rear surface (formerly the bottom wall) of the carton and pull it out away from the transport conveyor onto the drying conveyor. As the carton is pushed away from or out of the transport conveyor, a pair of tappers engage the top trailing edge of the carton and push the corners of the carton to the fully closed position. In actual practice, it has been found that the partially dried and thus tacky glue permits the lid top wall (formerly the rear wall of the lid) to spring upwardly a short distance as the carton falls off of the transport conveyor. A simple tapping of the corners at this point pushes the trailing edge of the upper wall downwardly where it is thereafter held by the tackiness of the glue on the lid top flaps and tabs.

This machine has numerous advantages, primary among which is the ease with which the lid may be formed and the tightness of the fit between the tray and the lid. Because the filled tray is used as a mandrel during the forming of the lid, there is no tendency for the relatively weak cardboard of the lid to collapse or buckle during the forming operation. Thus, a squared tray is fitted with a well squared lid which presents a pleasant looking, well shaped carton.

Other objects and advantages of this invention will be more readily apparent from the following description of the drawings in which;

FIGURE 2 is a diagrammatic perspective view of the machine illustrated in FIGURE 1, FIGURE 3 is a cross-sectional front elevational view of the machine taken immediately in front of the first station, FIGURE 3a is a diagrammatic illustration of the cam track and cam follower portion of FIGURE 3.

FIGURE 4 is a cross-sectional view taken along line 4—4 of FIGURE 3.

FIGURE 5 is a cross-sectional view taken along line 5—5 of FIGURE 4,

FIGURE 6 is a cross-sectional view taken along line 6—6 of FIGURE 4,

FIGURE 7 is a top plan view of the carton feeding magazine,

FIGURE 8 is a cross-sectional view taken along line 8—8 of FIGURE 7,

FIGURE 9 is a cross-sectional view taken along line 9—9 of FIGURE 8,

FIGURE 10 is a cross-sectional view taken along line 10—10 of FIGURE 8,

FIGURE 11 is a side elevational view of the transport conveyor,

FIGURE 12 is a top plan view of the transport conveyor,

FIGURE 13 is a cross-sectional view taken along line 13—13 of FIGURE 12,

FIGURE 14 is a cross-sectional view taken along line 14—14 of FIGURE 12,

FIGURE 15 is a cross-sectional view taken along line 15—15 of FIGURE 12,

FIGURE 16 is a top plan view of the transport conveyor with the buckets of the conveyor removed.

FIGURE 17 is a front end elevational view of the pusher lug mechanism,

FIGURE 18 is a top plan view of the drive to the infeed conveyor and the transport conveyor, FIGURE 19 is a cross-sectional view taken along line 19—19 of FIGURE 15.

General organization

Figure 1:
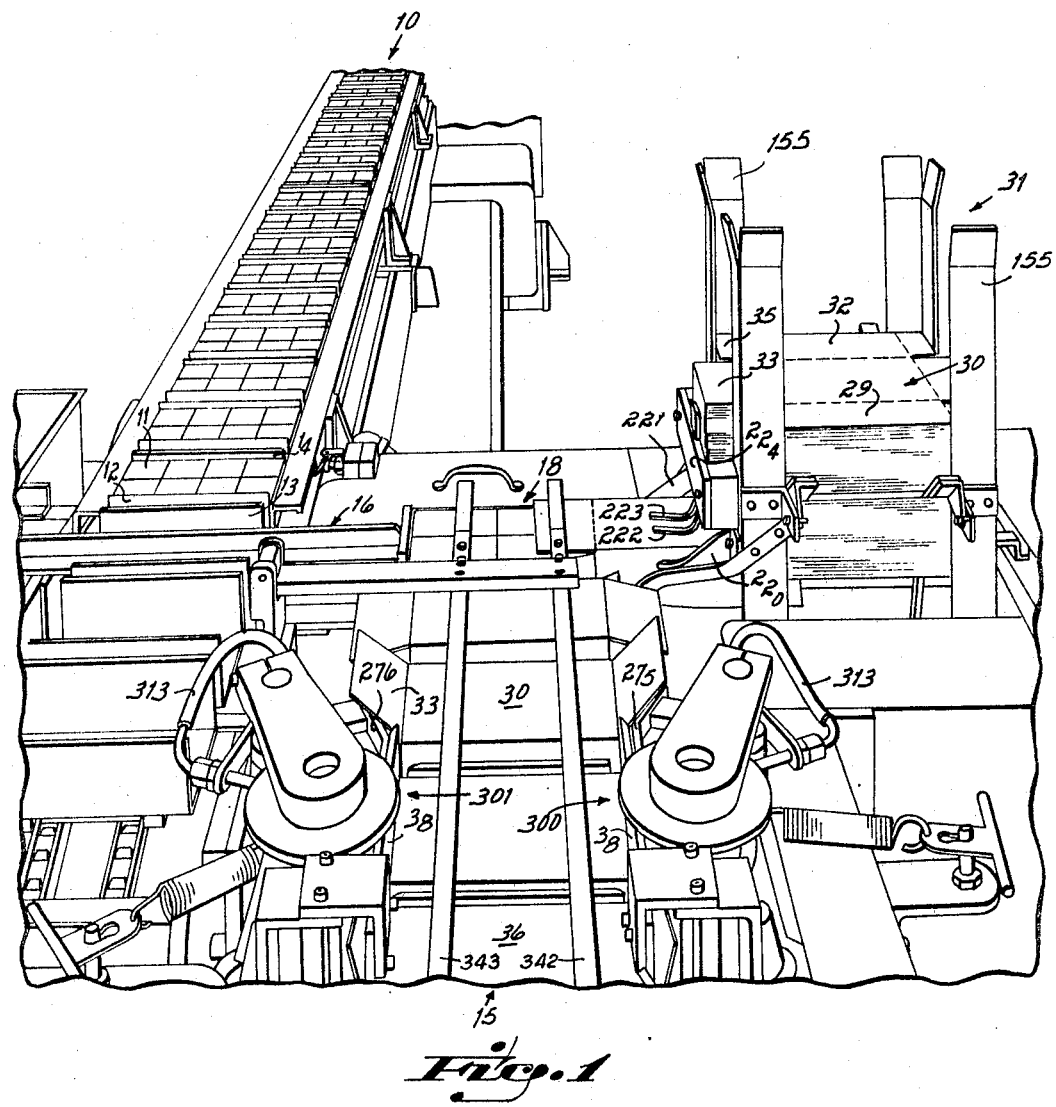
FIGURE 1 is a front perspective view of the machine of this invention.

The overall organization of the machine is perhaps best illustrated in FIGURE 2. As may be seen in that schematic figure, the lower halves 12 of the cardboard cartons (hereinafter referred to as trays 12) are supplied to the lidding machine of this application upon an intermittent drive infeed conveyor 10. Each of the trays 12 is filled with articles 11, such as candy bars or soap, when it reaches the end of the infeed conveyor 10. In actuality, the infeed conveyor 10 is a drying conveyor for another machine which fills and forms the tray 12.

On this infeed conveyor, the leading and trailing sides or walls of each tray 12 are supported by lugs 13 and 14, respectively, of so called buckets. These bucket lugs 13, 14 serve to accurately locate the trays on the infeed conveyor 10 and to support the tray while glue dries if the tray is assembled on the infeed conveyor.

The lidding or closing of the tray occurs upon a transport conveyor, indicated generally by the numeral 15. This conveyor is parallel to, but laterally offset from, the longitudinal center line of the infeed conveyor 10 and is so positioned that filled trays 12 may be pushed off of the front end of the infeed conveyor 10 over a stationary plate 17, onto the rear end of the transport conveyor 15 by a ram 16. At the end of the stroke of the ram 16, the filled tray is located in the first station 18 of the transport conveyor. Thereafter, the ram 16 is lifted vertically out of the way of the next oncoming tray 12 on the infeed conveyor 10, and in the raised position is returned or moved away from the transport conveyor 15 to the back side of its stroke and lowered into a ready position to push the next filled tray off the infeed conveyor into the first station 18 of the transport conveyor 15.

The transport conveyor 15 is also an intermittent movement conveyor. It too is a so called bucket conveyor of the type which has lugs 20, 21 engageable with the leading and trailing side walls of the carton as the carton is conveyed on the transport conveyor.

At the time the filled tray 12 arrives in the first station 18, the trailing lug 21 of that bucket which is at the first station is in an angulated position behind the vertical center line 24 of the sprockets 25 over which the rear end of the transport conveyor 15 is movable. This may perhaps be better seen in FIGURE 15. When the trailing lug 21 reaches the vertical plane of the center line 24, its front or carton engaging surface is located in a vertical plane. In the first station 18, it (lug 21) has not yet reached the vertical plane of center line 24 and is, therefore, in an angulated condition relative to the rear wall of the tray 12. Additionally, the front wall of the tray 12 which is in the first station 18, is spaced rearwardly from the front lug 20 of the transport conveyor bucket located at that station. Therefore, in this first station, the tray 12 is out of contact with both the leading and trailing lugs 20, 21 of the transport conveyor. These lugs only close in and pinch the carton when the carton is moved from the first station 18 to the second station 19.

In the first station 18, when the lugs 20, 21 are out of engagement with the leading and trailing side walls of the tray, a lid 30 is placed over the top of the filled tray 12. As may be seen in FIGURE 1, the lids 30 are stored in a flat condition in a magazine 31 and are fed sequentially from the magazine 31 over the trays in the first station 18. When the lid 30 arrives over the tray 12 at the first station, the front flap 29 and rear flap 32 is folded downwardly so that the lid is generally channel shaped with the web of the channel located in a horizontal plane above the downwardly depending flaps 29, 32. The lid top flap 33, and end tabs 34, 35, at this time extend laterally from the top, front and rear walls of the lid respectively.

The folded or channel shaped lid 30 is moved laterally out of the magazine 31 over the tray 12 in the first station 18. Since the leading and trailing walls of the tray 12 are at this time out of engagement with the front and rear lugs 20, 21 of the bucket conveyor, the front and rear flaps 29, 32 of the lid may be inserted between the tray and the lugs 20, 21. As soon as the lid has been placed over the filled tray at the first station 18, the transport conveyor drive mechanism indexes to move the cartons in each station forwardly. That tray 12 formerly located in the first station is moved to the second station 19. During this movement from the first station 18 to the second station 19, the trailing lug 21 of that bucket which had been located in the first station 18 moves from an angulated position into the vertical plane and in so doing, forces the tray 12, with a lid 30 placed over it, forwardly until the front flap 29 of the lid 30 engages the front lug 20 of the bucket. At this time, the covered tray (hereinafter referred to as a carton 36 to distinguish from an uncovered tray) is pinched between the leading and trailing lugs 20, 21 of the bucket conveyor 15. The carton 36 is then indexed to a third gluing station 40. During the travel between the second station 19 and the third station 40, the top flaps 33 of the lid are folded upwardly and the leading and trailing tabs 34, 35 are folded inwardly.

The carton then continues to a fourth station at which backup guides 38 are placed behind the upstanding top flaps 33. During movement between the fourth and fifth stations, glue is applied to the lid top flaps 33. Thereafter, the top flaps are folded downwardly into engagement with the end flaps 34, 35. The transport conveyor has two more stations, the sixth and seventh, which are drying stations. As the carton passes through these latter stations, the top flap 33 is held in engagement with the end tabs 34, 35. The time for the carton to pass through these two stations is sufficient for the glue to become tacky and hold the flaps in assembled relation. The lidded and closed carton 36 then falls off the transport conveyor 15 as the bucket within which it had been riding passes around the front end sprockets 45 of the transport conveyor. This causes the carton to fall onto a drying conveyor 42 with its front edge 29 resting upon the conveyor. Pusher lugs 46, 47 (FIGURES 15, 16) then engage the bottom of the carton 36 (now the rear side) and push it out of the bucket in the eighth station before the transport conveyor 15 can again index. As the filled carton 36 is pushed out of the transport conveyor 15 by the pusher lugs 46, 47 (FIGURES 15 and 16) knock down cams 48 and 49 (FIGURE 2) tap the upper trailing corner of the carton 36 so as to square up the carton corners. The cams 48, 49 are provided to push down the trailing side wall 32 of the lid which has a tendency to lift as the cartons fall off the transport conveyor onto the drying conveyor. These knock-down cams 48, 49 push that trailing edge back into a squared up condition. This is all that is required to hold the trailing edge 32 in the squared up condition because of the relative tacky condition of the glue by the time the carton arrives at this eighth station.

The cartons then move out of the machine on the drying conveyor 42 while resting upon the leading side 29 of the lid. As should now be evident, the lidding machine as disclosed in this application is very compact. Adding to this compactness is the fact that the cartons are placed on edge as they move out of the machine on the drying conveyor. The cartons thus occupy much less longitudinal space on the drying conveyor, and it may be made much shorter than would be possible if the cartons remained oriented on the drying conveyor the same way that they are oriented on the transport conveyor; i.e., while resting on the bottom surface of the tray.

Tray infeed conveyor

The tray infeed conveyor 10, transport ram 16, transport conveyor 15, and magazine feed mechanism must all be synchronized if there is to be no jam of the machine as filled trays 12 are transported or pushed from the infeed conveyor 10 onto the transport conveyor 15 and as the lids 30 are placed over the filled trays 12. Therefore, the infeed conveyor, the transport ram 16, the carton magazine feed mechanism and the transport conveyor 15 are all driven from a common main drive shaft 50. This shaft 50 extends parallel to the infeed conveyor 10 and is driven by an electric motor (not shown) through a gear box (not shown). For every two revolutions of this main drive shaft 50, the infeed conveyor 10 and transport conveyor 15 index one station. To convert the constantly rotating drive shaft 50 movement into an intermittent feed of the infeed conveyor 10 and transport conveyor 15, the drive from the main drive shaft 50 (FIGURES 3 and 5) to each of these conveyors is through a Geneva mechanism, indicated generally by the numeral 56.

Referring now to FIGURES 4, 5 and 6, the drive from the main drive shaft 50 is through a bevel gear 51 mounted upon the end of the shaft 50 to a bevel gear 52 attached to an input shaft 53. This input shaft 53 passes through bearings 54, 55 mounted in the machine frame 60. A pinion 61 mounted upon the end of input shaft 53 drives a gear 62 of a double dog mechanism 63. The gear 62 is keyed to a hub 64. The hub has a lateral flange 65 bolted to a dog plate 66. Thus, rotation of the gear 62 results in rotation of the hub 64 and attached dog plate 66 about the axis of a stub shaft 67 to which the hub is keyed. The shaft 67 is mounted in bearings out on opposite sides of a gear box 68 attached to the frame 60 of the machine.

As may be seen most clearly in FIGURE 4, the dog plate 66 has a pair of radially extending ears 70, 71 located on opposite sides of the plate. Each of these ears 70, 71 supports a rotatably journaled roller 72, 73. These rollers 72, 73 are adapted to be received within one of four equally spaced radial slots 75 located around a driven plate 76. The plate 76 is nonrotatably keyed to an output shaft 80 of the Geneva mechanism. Thus, as the dog plate 66 rotates through 180°, it moves the attached rollers 72, 73 into and out of one of the radial slots 75 of the plate 76, causing the plate 76 to be rotated through one-fourth of a revolution or 90°. Since the rollers 72, 73 are only in contact with the plate 76 through approximately 90° of this 180° movement, the output plate 76 has an intermittent movement while the dog plate 66 rotates continuously.

The intermittent moving output shaft 80 of the Geneva mechanism 56 passes through one side wall of the Geneva mechanism box 68 between a pair of frame members of the frame 60 which supports the shaft in a pair of spaced bearings 83, 84. Between the bearings 83, 84, the output shaft has a pair of sprockets 85, 86 keyed to it. These sprockets 85, 86 are the driving sprockets of the infeed conveyor 10. The infeed conveyor 10 consists of a pair of spaced endless chains 88, 89 (FIGURE 5) to which the leading and trailing lugs 13, 14 of the conveyor buckets are attached. Thus, as the Geneva mechanism is indexed, it causes the infeed conveyor 10 to be indexed one position.

Tray feed ram

The tray feed ram 16 pushes filled trays 12 from the infeed conveyor 10 onto the transport conveyor 15. It must then lift and move out of an obstruction position in front of the next tray 12 on the infeed conveyor. In the raised position, it is returned or moved laterally to its rearward position and dropped down preparatory to pushing the next tray from the infeed conveyor 10 onto the transport conveyor 15.

Referring to FIGURES 3 and 4, it will be seen that the ram 16 is carried by a depending bracket 90, which is laterally slidable upon a pair of slide rods 91, 92. The slide rods 91, 92 are in turn mounted upon end plates 93, 94, which are vertically movable relative to the stationary frame 60 of the machine.

The end plates 93, 94 are mounted upon a common bottom plate 95 which extends between them. The bottom plate 95 in turn has a pair of depending brackets 96, 97. The bracket 96 is attached to one end of a bell crank 98 by a pivot pin 99. The elbow or fulcrum of the bell crank 98 is supported upon a pivot pin 100 which is in turn supported within a bracket 101 bolted to a cross bar 102 of the frame 60. The opposite end of the bell crank 98 is pivotally attached to the upper end of a crank arm 104 by a pivot pin 105. Thus, upon downward movement of the crank arm 104, the bell crank 98 pivots about the pivot shaft 100 causing the bracket 96 and attached lower plate 95 of the ram assembly to be lifted.

In order to get a corresponding lifting movement at the rear end of the infeed ram assembly, the depending bracket 97 is pivotally attached to one end of a ball crank 107 by a pivot pin 108. The elbow of the bell crank 107 is pivotally journalled upon a pin 110 mounted within a bracket 111 rigidly attached to a cross member 112 of the frame 60. The opposite end of the bell crank 107 is pivotally attached by a pivot pin 115 to one end of a connector arm 116. The opposite end of the connecting arm 116 is connected to a pivot pin 117 journalled within one end of a bell crank 118. The elbow of this bell crank 118 is also journalled upon the pin 100 and the opposite end of the bell crank 118 is connected to arm 104 by pivot pin 105. Thus, upon downward movement of the arm 104, bell crank 98 pivots about pivot 100 causing the front end of the ram slide assembly to be lifted. Simultaneously, the rear end of the ram slide assembly is lifted as a result of downward movement of the arm 104 which causes the crank arm 118 to pivot about the pivot 100. This results in a rearward movement of the connector arm 116 and a counterclockwise movement of the bell crank 107 about the pivot 110. Counterclockwise rotation of the bell crank 107 lifts the rear end of the infeed ram assembly.

Vertical movement of the arm 104 is controlled by a bell crank 120, one end of which is connected by a pivot pin 121 to the lower end of the arm 104. The bell crank 120 is fulcrumed about a pivot pin 122 mounted within a bracket 123 attached to a vertical member of the machine frame 60. The other end of the bell crank 120 carries a roller or cam follower 125 which rides within a cam slot 126 (FIGURE 3a) of a cam plate 130. The cam plate 130 is driven in rotation about a cam shaft 131 by a chain and sprocket drive 132 from the main drive shaft 50. Thus, rotation of shaft 50 causes the cam plate 50 to rotate and move the arm 104 vertically.

Cam shaft 131 also has a second plate 135 keyed to it. This plate is also driven from the main drive shaft 50 through the chain and sprocket drive 132. The plate 135 has an eccentric pin 140 extending from one side of it, which carries one end of a connecting arm 141, the opposite end of which is pivotally connected to an extensible arm 143 by a pivot pin 144. The arm 143 is extensible as a result of a telescopic connection between its lower end and a pivotable bracket 145 supported upon a pin 146 mounted in the frame 60 of the machine. The upper end of the arm 143 is pivotally connected to one end of a connecting rod 150, the opposite end of which is pivotally connected to depending bracket 90 of the infeed ram 16. Thus, upon rotation of the main drive shaft 50, the shaft 131 and the attached plate 135 are driven in rotation. Rotation of the plate 135 results in reciprocation of the pusher ram 16 through the eccentric drive to the connecting arms 141, 143 and 150.

Because of the relative orientation of the lifter cam slot 126 and the pivot pin 140, the pusher ram is in its lower position as it moves from left to right as viewed in FIGURE 3 or as it pushes a filled tray 12 from the infeed conveyor 10 to the transport conveyor 15. At the end of its infeed stroke, the pusher ram is lifted, returned, and lowered preparatory to pushing the next filled tray 12 off the infeed conveyor.

Lid magazine and infeed

Referring now to FIGURES 1, 7, 8 and 9, wherein the carton feeding mechanism is illustrated, it will be seen that the carton lid magazine 31 supports a stack of lids in flat condition. The magazine consists of four right angle posts 155 each of which forms a corner for receiving one corner of one of the end tabs 34, 35. The stack is supported upon a pair of spaced rods 156, 157 located beneath and just inside the front and rear fold lines of the lid. This is clearly shown in FIGURE 9 where the lowermost lid 160 of the stack is shown in phantom. During operation of the machine, the lowermost lid in the stack is fed outwardly over a tray located upon the transport conveyor. As the lowermost lid 160 moves out of the magazine, its front and rear flaps 31, 32 are folded downwardly by a pair of plows 220, 221 (FIGURE 1) preparatory to being moved over the tray 12.

To remove this lowermost carton 160 from the magazine 31, the center section of the lid is lowered by a pair of vertically reciprocal suction cups 161, 162. These suction cups pull the center section of the lowermost lid downwardly as illustrated in FIGURE 9 until it is in a bowed condition. Thereafter, a knife 163 is moved laterally between the bowed center section of the lowermost lid 160 in the magazine and the lid next above it. This knife 163 holds the lowermost lid 160 in the bowed condition after the suction to the cups 161, 162 is released. The cups are subsequently moved further downwardly away from the lowermost carton.

The right side of the carton as viewed in FIGURES 7 and 8 is thereafter engaged by a pair of pusher bars 165, 166 which push the bowed lowermost carton out of the magazine and over the tray 12 at the first station 18 of the transport conveyor.

Because the carton is pushed from the magazine while the carton is in a bowed condition, it has much more rigidity in the horizontal plane than it would have if it were not bowed. As a result, the feed mechanism may be operated much more quickly or rapidly, and lighter weight cardboard may be used to form the lids.

The carton feeding mechanism must also be synchronized with the infeed 10 and transport 15 conveyor mechanisms. Therefore, it too, is driven from the main drive shaft 50 (FIGURE 8). To this end, the main drive shaft 50 drives a lid feed control shaft 170 (FIGURES 7, 8 and 10) through a chain and sprocket drive 171. Three eccentrics 172, 173 and 174 are nonrotatably keyed to this shaft 170. The eccentric 174 controls reciprocation of the separator knife 163 while eccentric 172 controls reciprocation of the pusher bars 165, 166 and eccentric 173 controls vertical reciprocation of the suction cups 161, 162.

Each of the eccentrics 172, 173, 174 consists of a main eccentric wheel 175 upon which a bearing strap 176 is slideable. Each of the straps includes a tapped lug 177 into which a connecting rod is threaded and locked by a lock nut 178. The straps are slideable upon the eccentrics so that rotation of the eccentrics 172, 173 and 174 results in reciprocation of the connecting rods 180, 181 and 182 respectively.

To support the separator knife 163 and the pusher rods 165, 166 for reciprocation, a pair of vertical cross-frame members 184, 185 are supported between a pair of vertical frame members 186. The cross-frame members 184, 185 support four guide rods 187, 188, 189 and 190. Two of the guide rods 187, 188, which are located in the same vertical plane (FIGURE 10), support a separator knife slide 195 for reciprocation, while the two other support rods 189, 190 support a reciprocable pusher bar slide 196. The slide 195 is caused to reciprocate upon the guide rods 187, 188 by a connecting arm 197 pivotally connected at its opposite ends to the slide 195 and a pivot rod 198. The opposite end of the rod 198 is pivotable upon a pivot shaft 199. The rod 198 is extensible within a bracket 200 and is pivotally connected by a pin 201 to the connecting rod 180 of the eccentric 174.

In a similar fashion, the eccentric 172 is connected so as to drive the pusher bar slide 196 by a connecting rod 205, and a connecting shaft 206 which is extensible within a bracket 207 pivotable about the shaft 199. The connecting bar 206 is connected to the connecting rod 181 by a pivot pin 208.

The vacuum suction cups 161, 162 are mounted upon a vertically movable platen 210 having guide rods 211, 212 depending from its bottom surface. These guide rods are slidable within a bearing plate 213. The connecting rod 182 of eccentric 173 is pivotally connected at its upper end by a pivot pin 215 to a depending lug of the platen 210 so that upon vertical reciprocation of the connecting rod 182, the suction cups are caused to raise and lower.

Suction to the cups 161, 162 is controlled by a cam (not shown) which causes the suction to be applied at the upper end of the stroke of connecting rod 182 when the suction cups are in engagement with the lowermost lid 160 in the magazine. As the suction cups are moved downwardly by the platen 210, the knife 163 is inserted between the bowed lowermost lid and the lid next above it. As soon as the knife has been inserted, suction to the suction cups 161, 162 is released as they continue their downward movement. Suction to the cups should be released prior to the pusher members 165, 166 engaging the cartons and pushing it out of the magazine in order that the cartons are not torn or defaced by sliding movement between the suction cup and the bottom surface of the lowermost lid.

As the lowermost lid 160 is pushed from the magazine and almost immediately upon its starting out from the magazine, the leading and trailing flaps 29, 32 of the lid 30 engage front and rear plows 220, 221 respectively (FIGURE 1). These plows cause the front flap 29 and the rear flap 32 of the lid 30 to be folded downwardly preparatory to the lid moving over the transport conveyor and thus, over the tray 12 at the first station 18 of the conveyor.

To hold down the lid as it is moved out of the magazine 31, a pair of hold down fingers 222, 223 (FIGURE 1) are mounted on the left side of the magazine as viewed in FIGURE 1. These fingers are vertically adjustable in a slideway of a plate 224 which is, in turn, bolted to two of the corner posts 155 of the magazine 31.

*Transport conveyor*

The transport conveyor 15 is driven from the output shaft 80 of the Geneva mechanism 56 so that it has an intermittent feed synchronized with the intermittent feed of the infeed conveyor 10. Mounted upon the Geneva mechanism output shaft 80 and keyed to it so as to be rotatable with the shaft 80, is a transport conveyor drive sprocket 225 (FIGURES 5, 15 and 18). This sprocket 225 drives a sprocket 226 of a conveyor drive shaft 230 through an endless chain 227. Shaft 230 extends between and is rotatable within bearings mounted in frame members 231, 232, 233 of the machine frame 60. The drive shaft 230 in turn supports and drives the front sprockets 45 of the main transport conveyor 15. These sprockets 45 drive the parallel endless chains 235, 236 of the main transport conveyor 15. At the rear of the transport conveyor 15, these chains pass over idler sprockets 25 mounted upon an idler shaft 239. This shaft 239 is supported by a pair of brackets 240 mounted upon a cross-bar 241 of the machine frame 60.

Referring now to FIGURES 15 and 19, it will be seen that each bucket 250 of the transport conveyor 15 has a front plate or lug 20, a rear plate or lug 21 and a pair of intermediate support plates 251, 252. Both the front and rear plates 20, 21, are L-shaped in a cross-section with the short leg 253 being attached to two opposed links of the chains 235, 236. The attachment between the chains and the front and rear lugs 20, 21 consists of a pair of small right angle brackets 225 riveted to the bottom of the lugs 20, 21 and connected to the pivot pins of the chain conveyors 235, 236. Thus, the long legs of the front and rear lugs 20, 21 always extend perpendicular to the endless chains 235, 236 or to the tangent of the chains as they pass around the sprockets 45, 25 at the front and rear ends of the conveyor respectively.

The right angle lugs 20, 21 face each other so that between them they define the bucket 250. The space between the front and rear plates 20, 21 is partially filled by the horizontal support plates 251, 252 which are also attached to the chains 235, 236 of the transport conveyor by small right angle brackets 255 having their horizontal legs attached to the bottom of the plates 251, 252 and their vertical legs pinned to the pivot pins of the chain conveyor. Each bucket 250 thus consists of a front lug 20, a pair of support plates 251, 252, and a rear lug 21, which defines a pocket adapted to receive a tray from the infeed conveyor 10 and a lid from the magazine 31 during each cycle of the transport conveyor and to deposit the assembled carton 36 upon the drying conveyor 42.

As may be seen most clearly in FIGURE 15, a tray 12 is inserted into a bucket 250 of the transport conveyor at the first station 18 while the rear lug 21 of the bucket 250 is behind the vertical center line 24 of the rear sprocket 25 of the transport conveyor 15. At this time, the rear lug 21 is angulated relative to the center line 24 so that it defines a large gap 260 between the rear wall of the tray and the inside surface 261 of the lug 21. A gap or space 262 is also provided between the inside surface of the front lug 20 and the front wall 263 of the tray 12 in this first station 18 of the transport conveyor. While the tray is in this position at the first station 18 of the transport conveyor 15, the channel-shaped lid with its top surface in the horizontal plane and its front and rear walls 29, 32 respectively depending from the top surface in a vertical plane, is inserted between the lugs and the tray, as shown in FIGURES 1 and 2.

After the lid has been moved laterally over the tray 12, the transport conveyor is indexed one station. During this indexing of the bucket 250 from the first station 18 to the second station 19, the rear lug 21 moves into the vertical plane and in so doing, pushes the tray 12 forwardly until the front tray wall 263 engages the inside wall of the front lug 20 and closes the gaps 260, 262. Thus, the tray is lightly pinched between the front and rear lugs 20, 21 of a bucket 250 prior to the time the bucket 250 arrives at the second station 19 of the transport conveyor.

To maintain the buckets 250 in the horizontal plane as the buckets move along the upper stretch of the transport conveyor, an upper guide rail 267 and a lower guide rail 268 (FIGURE 13) engage and support the upper and lower surfaces respectively of the chain 235, 236 of the transport conveyor 15. During return movement from the eighth to the first station, the lower stretch of the chains of the transport conveyor is precluded from sagging by a pair of support members 269, 270 over which the chains 235, 236 ride.

Referring now to FIGURES 11 and 12, it will be seen that between the second and third stations 22 of the transport conveyor 15, the top flaps 33 of the lid are plowed upwardly into a vertical plane by a pair of stationary opening flap guides 275, 276 located on opposite sides and above the transport conveyor. These guides extend rearwardly and downwardly into the path of movement of the lid 30. As may be seen most clearly in FIGURE 12, the rear end of these guides 275, 276 extend outwardly away from the center line of the transport conveyor in addition to sloping downwardly so as to catch and push the leading or front tab 34 inwardly to a closed position while raising the top flaps 33.

To close the rear tabs 35, rotatable star wheels 280, 281 are provide don opposite sides of the conveyor 15. These star wheels 280, 281 are mounted beneath the transport conveyor 15 and on opposite sides of it. They are mounted upon and keyed to a common drive shaft 283, which is supported in bearings of the machine frame 60. Shaft 283 is driven by a sprocket 287. The sprocket 287 is in turn driven by a chain 288 from a sprocket 289 mounted upon a shaft 290. Shaft 290 is driven by a chain and sprocket drive 291 from the main transport conveyor drive shaft 230.

Each of the star wheels 280, 281 has three prongs or points 295 extending radially from it. The leading edge 296 of each of these prongs is a radial surface engageable with the trailing surface of one of the rear tabs 35. The gear ratio between the main drive shaft 50 and the star wheel drive shaft 283 is such that the tab engaging surfaces 296 of the prongs 295 travel at a faster linear speed than the cartons. Thus, the star wheels 280, 281 are operable on opposite sides of the transport conveyor to engage and push the rear tabs 35 inwardly beneath the opening flap guides 275, 276.

As the cartons continue on the conveyor with their tabs 34, 35 folded inwardly and the end flaps 33 folded upwardly they pass between a pair of glue rolls indicated generally by the numerals 300, 301 (FIGURE 12). These glue rolls are located on opposite sides of the conveyor in a position to place glue upon the areas adjacent the leading and trailing edges of the upwardly projecting top flaps 33 as indicated by the stippled areas 305, 306 of FIGURE 11. At the time the glue is applied to the stippled areas 305, 306 of the upstanding flaps 33, the flaps 33 are backed by backing guides 38, as is most readily apparent in FIGURES 12 and 13. After glue has been applied to these areas 305, 306, the top flap is folded downwardly and these areas are held in pressure engagement with the end tabs 34, 35 of the lid until the glue is at least partially dry.

Referring now to FIGURES 1, 11, 12 and 13, it will be seen that the liquid adhesive is applied to the lid flaps 33 by the opposed glue rollers 310 which are rotated in the direction of lid movement. Each glue roller 310 is mounted upon a vertical drive shaft 311 (FIGURE 11) projecting upwardly through sumps 312 which collect the glue as it drains from the rolls. The liquid glue is supplied to the rolls by supply conduits 313 (FIGURE 1) and the excess glue is scraped from the rolls by spring loaded scrapers 315 which bear against the periphery of the rollers. The glue drains from the sumps 312 to a suitable pumping apparatus (not shown) to be recirculated back to the rolls by way of the conduits 313. The periphery of each glue roll includes a suitable printing area such as a roughened surface to print the pattern 305, 306 on the advancing top flap 33 while the scraper removes the glue from the smooth surface of the roller. Since the gluing apparatus is well known in the art, the structural details have been omitted from this disclosure.

To rotate the glue rolls 310, the lower end of each drive shaft 311 includes a helical gear 316 meshing with a driving gear 317 mounted upon a cross shaft 318. The cross shaft is journaled in bearing brackets 320 carried by the machine frame. One outer end of the shaft 318 includes a driven sprocket 321 in driving connection with a chain 322 which is in turn driven through a chain and sprocket drive 323 from the main transport conveyor driven shaft 230, such that the glue rolls are advanced intermittently with the main transport conveyor. The driving ratios are such that the printing areas of the glue rolls register with the edge portions of the top flaps 33 to properly locate the glue patterns 305, 306.

After the glue has been applied to the top flaps 33 and during movement between the fifth and sixth stations, the end flaps 33 are plowed outwardly and downwardly by stationary closing flap guides 340, 341 (FIGURES 11 and 12) located on opposite sides of the transport conveyor. These guides engage the upwardly extending flaps 33 as they move forwardly and force them beneath the guides into a position in which the glued surfaces 305, 306 are in engagement with the closing tabs 34, 35.

During movement of the cartons 36 on the transport conveyor 15, the cartons are held down by a pair of spaced guide rails 342, 343. These guide rails extend from the second station of the transport conveyor through the eighth or last station.

At the eighth station of the transport conveyor, the bucket 250 passes around the front end sprockets 45 and in so doing, the front lug 20 passes out of engagement with the front side of the carton 36 such that the carton is dropped upon its leading side 263 on the drying conveyor 42. While the carton is supported on the drying conveyor 42, it must be moved out away from an obstructing position in front of the trailing lug 21 before the transport conveyor again indexes. This may be done by running the drying conveyor 42 independently of the drive to the rest of the machine at a speed operable to carry the cartons quickly away from the front end of the transport conveyor. If this practice is followed, however, large gaps appear between the cartons on the drying conveyor and the number of cartons which it can support is very limited. Another alternative, and one which has been followed in the machine of this application, is to push the loaded carton 36 away from the front end of the transport conveyor with a pusher mechanism which is operated in timed sequence with the indexing of the transport conveyor.

The drying conveyor 42 is an endless belt which is driven independently of the drive to the transport conveyor by a variable speed motor (not shown).

The pusher bars 46, 47 for moving the carton away from the front end of the transport conveyor consist of a pair of spring biased bell crank shaped arms mounted upon pivot posts or fulcrums 350, 351 (FIGURE 17). The pivot posts are in turn each mounted upon a movable slide 352, 353 respectively. Since the slides are identical, only one will be described in detail, although it should be appreciated that an identical slide is mounted upon the opposite side of the drying conveyor 42.

Referring now to FIGURES 15, 16 and 17, it will be seen that the slide 252 is mounted for reciprocation upon a guide rod 355. The guide rod 355 is in turn fixedly mounted at the rear end upon a bracket 356 depending from a cross-bar 357 of the frame 60. The front of the guide rod 355 is supported by a front bracket 360 mounted upon a cross-bar 361 of the frame. Depending from the bottom of the slide 352 is a lug 362 which supports a depending roller 363. The roller 363 is rotatable within a slide-way defined by a pair of spaced slides 365, 366. The slides 365, 366, in cooperation with the roller 363, preclude rotational movement of the slide 352 relative to the guide rod 355.

To reciprocate the slide 352, it has a laterally extending pin 370 which supports one end of a crank arm 371. The opposite end of the crank arm 371 is pivotally connected to an arm 372 by a pivot pin 373. The arm 372 is nonrotatably keyed to a shaft 374 which extends between the side frame members 186 and is supported within bearings 375, 376 mounted in the side members 186. Rotation of the shaft 374 is controlled by a second arm 380 which is also nonrotatably keyed to the shaft 374. The lower end of the arm 380 is connected by a pivot connection 381 to one end of a crank arm 382. The opposite end of the crank arm 382 is connected by a pivot pin 383 to an eccentric 384. The eccentric 384 is mounted upon a stub shaft 385 supported within bearings mounted in one side member 186 and in a bracket 390 attached to the side member 186. The stub shaft is in turn driven by a chain and sprocket drive 391 from a miter box 392. The miter box 392 is driven by the main drive shaft 50 of the machine.

Because the slides 352, 353 are driven from the main drive shaft 50, they reciprocate in timed relation with the indexing of the transport conveyor 15. As the slides 352, 353 move forwardly, the pivot fingers 46, 47 engage the rear vertical wall of the carton 36 and push the carton 36 away from the front of the transport conveyor. As the fingers 46, 47 move rearwardly, the rearward sloping surfaces 400, 401 (FIGURE 16) engage the lateral sides of the carton immediately behind that carton which has just been pushed away from the front of the transport conveyor. Because these surfaces 400, 401 are angulated laterally and rearwardly, they are cammed laterally against the bias of tension springs 402, 403 and drag over the lateral sides of the carton 36 into a position behind it preparatory to pushing it away from the transport conveyor 15.

The stroke of the pusher fingers 46, 47 is only sufficient to push the carton 36 out of the eighth station onto the drying conveyor and thus, out of an interfering position in front of the trailing lug 21 of the bucket 250 which has just deposited the carton upon the drying conveyor 42.

As the cartons 36 fall off the transport conveyor 15 onto the drying conveyor 42, there is a tendency for the upper side wall 32 (formerly the rear wall when the carton was on the transport conveyor 15) of the lid to lift up approximately one-sixteenth of an inch out of a squared position. Therefore, tapping fingers 48, 49 are provided in the path of movement of the top wall 32 to push the upper rear trailing corners 415, 416 of the lid back down into a squared condition.

Referring now to FIGURES 2 and 15, it will be seen that as the pusher members 46, 47 move forwardly to push a carton 36 out of and away from the transport conveyor 15, the upper ends 404, 405 of the pusher members 46, 47 engage depending sections of the tapping fingers of bell cranks 48, 49 respectively. In so doing, they cause the bell cranks 48, 49 to rotate in a counterclockwise direction as viewed in FIGURE 2 about a shaft 412. Upon rotation of the cranks 48, 49, rearwardly extending arms 413 of the bell cranks 48, 49 engage the upper rear trailing corners 415, 416 of the carton 36 and tap those corners downwardly. At this time, the glue which was applied to the top flap 33 is sufficiently tacky as to hold the rear flap 32 downwardly after the rear corner of the flap 32 is tapped down by the tapper fingers 48, 49. In this way, the upper rear corners of the carton 36 are squared up as the carton is pulled away fom the transport conveyor 15.

*Operation*

Trays 12 are fed into the lidding machine by the intermittently moving infeed conveyor 10. The forwardmost tray 12 on the infeed conveyor is engaged by a pusher ram 16 operable to push the first tray on the infeed conveyor 10 laterally into the first station 18 of the transport conveyor. At this time, the trailing lug 21 of the transport conveyor bucket 250 which receives the tray 12 at the first station is behind the vertical center line of the rear sprocket 25 over which the transport conveyors move. In this position, the rear lug 21 is angulated and out of engagement with the rear vertical wall of the tray 12. Additionally, the forward wall 263 of the tray 12 is spaced rearwardly from the front lug 20 of the bucket 250 at the first station 18.

Immediately after the arrival of a tray 12 in the first station 18 of the transport conveyor, a lid 30 is pushed out of the magazine 31 by the carton feeding mechanism. As the lid 30 moves out of the magazine 31, its front and rear flaps 29, 32 are folded downwardly into the vertical planes and the now channel-shaped lid is moved laterally over the top of the tray 12 in the first station 18. At this time, the lid 30 may easily be inserted between the tray 12 and the lugs 20, 21 of the bucket (see FIGURE 15) within which it is resting because of the gaps between the tray and the lugs 20, 21.

As the tray is indexed from the first station 18 to the second station 19, the rear lug 21 is moved into the vertical plane 24 and in moving, it pushes the tray forwardly until the front flap 29 engages the front lug 20 of the bucket 250 and the carton with the partially assembled lid 30 over it, is pinched lightly between the front and rear lugs 20, 21. The top flaps 33 of the lid 30 are then folded upwardly and the leading tabs 34 of the front wall 29 of the lid 30 are folded inwardly by the flap guides 275, 276 on opposite sides of the transport conveyor 15. The rear tabs 35 of the rear wall 32 of the lid are then folded inwardly by the star wheels 280, 281 rotating in the direction of movement of the transport conveyor 15. Points or protrusions 295 on the star wheel engage the trailing surface of the tabs 35 and push the tabs inwardly beneath the flap guides 275, 276. Thereafter, glue is applied to the surface areas adjacent the leading and trailing sides of the upstanding top flaps 33 which are at this time backed by backing plates 38.

During continued movement of the carton along the conveyor 15, the top flaps 33 are folded downwardly into engagement with the tabs 34, 35 of the front and rear flaps 29, 32 of the lid. The end flaps 33 are held in this position by the closing flaps guides 340, 341 as the cartons progress to the end of the conveyor.

At the end of the conveyor 15, the cartons 36 drop off the end of the transport conveyor 15 as it travels around the front sprockets 45. The cartons fall in a vertical position onto the drying conveyor 42 with the front wall or flap 32 resting upon the top surface of the drying conveyor 42. The pusher members 46, 47 then engage the rear vertical wall of the carton 36 and push it forwardly on the drying conveyor out of a position in which it would normally interfere with continued downward movement of the rear lug 21 of the bucket 250 from which the carton has been removed.

In pushing the cartons 36 forwardly, the pusher members 46, 47 engage and actuate the tapping fingers 48, 49. These fingers tap down the upper rear corners 415, 416 of the carton into a squared condition. The cartons are then conveyed in the vertical position out of the machine on the drying conveyor.

While only one preferred embodiment of the invention of this application has been disclosed herein, those skilled in the art to which this invention pertains will readily appreciate numerous changes and alterations which may be made without departing from the spirit of the invention. Therefore, we do not intend to be limited except by the appended claims.

Having described our invention, we claim:

1. Apparatus for placing lids upon filled trays to form a complete carton comprising,
   an infeed conveyor for supplying open top trays filled with articles to be enclosed in the completed carton,
   a transport conveyor parallel to but laterally offset from said infeed conveyor, said transport conveyor having buckets adapted to receive said trays, said buckets being at least partially defined by upstanding lugs engageable with leading and trailing sides of said cartons,
   a pusher ram for moving trays laterally off of said infeed conveyor and onto said transport conveyor,
   magazine means for storing a stack of lids in a flat condition, each of said lids having a cover section, front and rear flaps, end flaps, and closure tabs attached to said front and rear flaps,
   feeder means for moving said lids laterally out of said magazine and over the open top of said trays,
   first flap control means located in the path of movement of said lids along said transport conveyor for lifting said end flaps into a vertical plane,
   tab control means in the path of movement of said lid along said transport conveyor for folding said closure tabs inwardly against the side walls of said tray,
   means for applying glue to said vertically upstanding end flaps, and
   second flap control means in the path of movement of said lid on said transport conveyor for folding said end flaps downwardly into engagement with said closure tabs.

2. Apparatus for placing lids upon filled trays to form a complete carton comprising,
   an infeed conveyor for supplying open top trays filled with articles to be enclosed in the completed carton,
   a transport conveyor parallel to but laterally offset from said infeed conveyor, said transport conveyor having buckets adapted to receive said trays, said buckets being at least partially defined by upstanding lugs engageable with leading and trailing sides of said cartons,
   a pusher ram for moving trays laterally off of said infeed conveyor and onto said transport conveyor,
   magazine means for storing a stack of lids in a flat condition, each of said lids having a cover section, front and rear flaps, end flaps, and closure tabs attached to said front and rear flaps,
   feeder means for moving said lids laterally out of said magazine and over the open top of said trays on said transport conveyor,
   first flap control means in the path of movement of said lid between said magazine and said transport conveyor for folding said front and rear flaps downwardly,
   second flap control means located in the path of movement of said lids along said transport conveyor for lifting said end flaps into a vertical plane,
   tab control means in the path of movement of said lid along said transport conveyor for folding said closure tabs inwardly against the side walls of said tray,
   means for applying glue to said vertically upstanding end flaps, and
   means in the path of movement of said lid on said transport conveyor for folding said end flaps downwardly into engagement with said closure tabs.

3. Apparatus for placing lids upon filled trays to form a complete carton comprising,
   a transport conveyor having buckets adapted to receive trays, said buckets being at least partially defined by upstanding lugs engageable with leading and trailing sides of said cartons,
   magazine means for storing a stack of lids in a flat condition, each of said lids having a cover section, front and rear flaps and two end flaps,
   feeder means for moving said lids out of said magazine and over the open top of said trays on said transport conveyor,
   first flap control means in the path of movement of said lid between said magazine and said transport conveyor for folding said front and rear flaps downwardly,
   means in the path of movement of said lid on said transport conveyor for closing said lid end flaps about a tray on said transport conveyor, and
   a second conveyor located at the front end of the transport conveyor and adapted to receive cartons as they pass off of said transport conveyor, said second conveyor being located beneath said transport conveyor whereby cartons fall off of the end of said transport conveyor and are rotated 90° in passing between said transport conveyor and said second conveyor.

4. Apparatus for placing lids upon filled trays to form a complete carton comprising,
   a transport conveyor having buckets adapted to receive trays, said buckets being at least partially defined by upstanding lugs engageable with leading and trailing sides of said cartons,
   magazine means for storing a stack of lids in a flat condition, each of said lids having a cover section, front and rear flaps, end flaps, and closure tabs attached to said front and rear flaps,
   feeder means for moving said lids out of said magazine and over the open top of said trays,
   first flap control means located in the path of movement of said lids along said transport conveyor for lifting said end flaps into a vertical plane, tab control means in the path of movement of said lid along said transport conveyor for folding said closure tabs inwardly against the side walls of said tray, means for applying glue to said vertically upstanding end flaps, and second flap control means in the path of movement of said lid on said transport conveyor for folding said end flaps downwardly into engagement with said closure tabs.

5. Apparatus for placing lids upon filled trays to form a complete carton comprising, a transport conveyor having buckets adapted to receive trays, said buckets being at least partially defined by upstanding lugs engageable with leading and trailing sides of said cartons, magazine means for storing a stack of lids in a flat condition, each of said lids having a cover section, front and rear flaps, end flaps, and closure tabs attached to said front and rear flaps, feeder means for moving said lids laterally out of said magazine and over the open top of said trays on said transport conveyor, first flap control means in the path of movement of said lid between said magazine and said transport conveyor for folding said front and rear flaps downwardly, second flap control means located in the path of movement of said lids along said transport conveyor for lifting said end flaps into a vertical plane, tab control means in the path of movement of said lid along said transport conveyor for folding said closure tabs inwardly against the side walls of said tray, means for applying glue to said vertically upstanding end flaps, and means in the path of movement of said lid on said transport conveyor for folding said end flaps downwardly into engagement with said closure tabs.

6. Packaging apparatus for placing lids upon filled trays to form filled and closed cartons, said apparatus comprising, an endless chain transport conveyor having buckets adapted to receive trays, each of said trays having a bottom wall and four vertical side walls, each of said buckets being at least partially defined by upstanding lugs engageable with leading and trailing sides of said cartons, a magazine for storing a stack of lids, each of said lids having a tray covering surface, front, rear and two side wall flaps attached along one edge to said tray covering surface, feeder means for moving said lids from said magazine to said transport conveyor and placing said lids over said trays on said transport conveyor, said lids having their front and rear flaps folded downwardly when placed over said trays, and means in the path of movement of said transport conveyor for closing and sealing the side flaps of said lid over said tray.

7. Packaging apparatus for placing lids upon filled trays to form filled and closed cartons, said apparatus comprising, an endless chain transport conveyor having buckets adapted to receive trays, each of said trays having a bottom wall and four vertical side walls, each of said buckets being at least partially defined by upstanding lugs engageable with leading and trailing sides of said cartons, a magazine for storing a stack of lids in a flat condition, each of said lids having a tray covering surface, front, rear and two side wall flaps attached along one edge to said tray covering surface, means for moving said lids laterally from said magazine to said transport conveyor and placing said lids over said trays on said transport conveyor, flap control means in the path of movement of said lid between said magazine and said transport conveyor for folding said front and rear flaps downwardly, and means in the path of movement of said transport conveyor for closing and sealing the side flaps of said lid over said tray.

8. Packaging apparatus for placing lids upon filled trays to form filled and closed cartons, said apparatus comprising, an endless chain transport conveyor having buckets adapted to receive trays, each of said trays having a bottom wall and four vertical side walls, each of said buckets being at least partially defined by upstanding lugs engageable with leading and trailing sides of said cartons, a magazine for storing a stack of lids in a flat condition, each of said lids having a tray covering surface, front, rear and two side wall flaps attached along one edge to said tray covering surface, means for moving said lids from said magazine to said transport conveyor and placing said lids over said trays on said transport conveyor before that lug which is engageable with the trailing side of the carton actually engages said trailing side of the carton, flap control means in the path of movement of said lid between said magazine and said transport conveyor for folding said front and rear flaps downwardly, and means in the path of movement of said transport conveyor for closing and sealing the side flaps of said lid over said tray.

9. Packaging apparatus for placing lids upon filled trays to form filled and closed cartons, said apparatus comprising, an endless chain transport conveyor having buckets adapted to receive trays, each of said trays having a bottom wall and four vertical side walls, each of said buckets being at least partially defined by upstanding lugs engageable with leading and trailing sides of said cartons, a magazine for storing a stack of lids, each of said lids having a tray covering surface, front, rear and two side wall flaps attached along one edge to said tray covering surface, feeder means for moving said lids from said magazine to said transport conveyor and placing said lids over said trays on said transport conveyor, said lids having their front and rear flaps folded downwardly when placed over said trays, said feeder means being positioned so as to place said lids over said trays prior to the engagement of said carton trailing side engageable lug with said carton trailing side, and means in the path of movement of said transport conveyor for closing and sealing the side flaps of said lid over said tray.

10. Packaging apparatus for placing lids upon filled trays to form filled and closed cartons, said apparatus comprising, an endless chain transport conveyor adapter to receive trays, each of said trays having a bottom wall and four vertical side walls, a magazine for storing a stack of lids, each of said lids having a tray covering surface, front, rear, and two side wall flaps attached along one edge to said tray covering surface, feeder means for moving said lids from said magazine to said transport conveyor and placing said lids over said trays on said transport conveyor, means in the path of movement of said transport conveyor for closing and sealing the flaps of said lid over said tray to form a complete closed carton, a third conveyor located at the front end of the transport conveyor and adapted to receive cartons as they pass off of said transport conveyor, said third conveyor being located beneath said transport conveyor whereby cartons fall off of the end of said transport and are rotated ninety degrees in passing between said transport conveyor and said third conveyor, and tapping fingers engageable with the upper trailing side of the cartons on said third conveyor to push said upper trailing side downwardly into squared condition.

11. Packaging apparatus for placing lids upon filled trays to form filled and closed cartons, said apparatus comprising, an endless chain transport conveyor adapter to receive trays, each of said trays having a bottom wall and four vertical side walls, a magazine for storing a stack of lids, each of said lids having a tray covering surface, front, rear, and two side wall flaps attached along one edge to said tray covering surface, feeder means for moving said lids from said magazine to said transport conveyor and placing said lids over said trays on said transport conveyor, means in the path of movement of said transport conveyor for closing and sealing the flaps of said lid over said tray to form a complete closed carton, a third conveyor located at the front end of the transport conveyor and adapted to receive cartons as they pass off of said transport conveyor, said third conveyor being located beneath said transport conveyor whereby cartons fall off of the end of said transport and are rotated ninety degrees in passing between said transport conveyor and said third conveyor, pusher means for pushing said cartons away from the front of said transport conveyor onto said third conveyor, and tapping fingers actuated by said pusher means for pushing the upper trailing sides of the cartons on said third conveyor downwardly.

12. Apparatus for placing lids upon filled trays to form a complete carton comprising, an endless chain transport conveyor having buckets adapted to receive trays, said buckets being at least partially defined by upstanding lugs engageable with leading and trailing sides of said cartons, magazine means for storing a stack of lids in a flat condition, each of said lids having a cover section, front and rear flaps, end flaps, and closure tabs attached to said front and rear flaps, feeder means for moving said lids laterally out of said magazine and over the open top of said trays on said transport conveyor, first flap control means in the path of movement of said lid between said magazine and said transport conveyor for folding said front and rear flaps downwardly, second flap control means located in the path of movement of said lids along said transport conveyor for lifting said end flaps into a vertical plane, tab control means in the path of movement of said lid along said transport conveyor for folding said closure tabs inwardly against the side walls of said tray, means for applying glue to said vertically upstanding end flaps, means in the path of movement of said lid on said transport conveyor for folding said end flaps downwardly into engagement with said closure tabs to form a completed carton, a drying conveyor mounted in front and beneath said transport conveyor for receiving said cartons as they fall off the end of said transport conveyor and are rotated ninety degrees so that said lid front flap rests upon said drying conveyor, pusher means for pushing said cartons away from said transport conveyor onto said drying conveyor, and tapping fingers engageable with the upper trailing side of the cartons on said drying conveyor to push said upper trailing side downwardly into a squared condition.

References Cited
UNITED STATES PATENTS

| | | | |
|---|---|---|---|
| 2,623,338 | 12/1952 | Riemer | 53—42 |
| 3,138,905 | 6/1964 | Ellinger | 53—37 |

GRANVILLE Y. CUSTER, JR., *Primary Examiner.*